United States Patent [19]

Tozoni

[11] Patent Number: 5,783,878
[45] Date of Patent: Jul. 21, 1998

[54] SELF-REGULATING ELECTROMAGNETIC LEVITATION CATAPULT

[76] Inventor: Oleg V. Tozoni, 11911 Parklawn Dr. #304, Rockville, Md. 20852

[21] Appl. No.: 685,618

[22] Filed: Jul. 24, 1996

Related U.S. Application Data

[63] Continuation-in-part of Ser. No. 631,002, Apr. 12, 1996.
[51] Int. Cl.$^6$ ...................................................... H02K 41/00
[52] U.S. Cl. ................................................ 310/12; 318/135
[58] Field of Search ................................ 310/12, 13, 14, 310/90.5; 318/135; 104/282, 283, 286, 290, 292

[56] References Cited

U.S. PATENT DOCUMENTS

| | | | |
|---|---|---|---|
| 4,841,833 | 6/1989 | Scherbarth et al. | 310/12 X |
| 4,881,446 | 11/1989 | Marks et al. | 104/292 X |
| 4,996,903 | 3/1991 | Arakaki | 310/12 X |
| 5,208,496 | 5/1993 | Tozoni et al. | 310/12 |
| 5,225,726 | 7/1993 | Tozoni | 310/120 |

*Primary Examiner*—Thomas M. Dougherty
*Assistant Examiner*—Judson H. Jones

[57] ABSTRACT

An Electromagnetic Levitation Catapult for preliminary acceleration of a heavy individual payload includes a Magnetodynamic Levitation and Stabilizing Self-Regulating System providing stable flight of the payload along a predetermined trajectory, a rotor with changeable size of the pole pitch, a stator extended along the trajectory of flight and a synchronizing mechanism. The stator is divided into three distinct sections: a start section where the winding turns have the same length, an acceleration section where the length of the turns increases in the direction from the start section, and a deceleration section. The payload is supported by a chassis carrying the rotor, so that when the rotor engages the stator, a propulsion force is created and propulses the payload along the trajectory. The rotor includes immovable long magnets and short magnets capable of being moved in the vertical direction. The synchronizing mechanism co-ordinates the pole pitch of the rotor with the turn length of the stator winding. Once the payload has approached the acceleration section, the synchronizing mechanism "feels" increment in the turns length and moves the short magnets downward in order to increase the size of the pole pitch and to increase the propulsion force accelerating the payload to the required speed.

12 Claims, 6 Drawing Sheets

SELF-REGULATING ELECTROMAGNETIC LEVITATION CATAPULT

This application is a Continuation-In Part of U.S. application Ser. No. 08/631,002 dated Apr. 12, 1996.

BACKGROUND OF THE INVENTION

The present invention involves an acceleration device or "catapult" which applies the energy of the sources disposed at the ground for preliminary acceleration of launched heavy individual payloads. The greater the mass and velocity of the payload which the catapult is capable of providing, the greater its effectiveness.

It must be noted here that the masses of the launched payloads can reach hundred of tons, and their velocity when breaking away from a catapult should be commensurate with the first cosmic velocity. This means that the power of the ground source should be within thousands MWT, i.e. the power source for the catapult must be of very high power.

The main principles of work of the proposed catapult are the same as those propose or the Linear Synchronous Motor (LSM) in U.S. Pat. No. 5,208,496 and No. 5,225,726. The propulsion (Lorentz) force is engendered by the interaction between traveling current wave in the three-phase winding of its stator and the magnetic field created by superconductive magnets of the rotor, which carries accelerated payloads. However, in contrast to the LSM, the propulsion force has to overcome not only air resistance to the movement of the rotor together with payloads but also inertia of the entire (rotor plus payloads) accelerated mass discussed above. The air resistance grows in proportion to the square of catapult speed. Accordingly, power consumed by the catapult from the ground source should permanently grow during the entire process of rotor acceleration.

On the other hand, the rotor speed equals velocity V of current traveling wave in the stator, which is proportional to frequency f of the power supply three-phased current, as well as to wave length $\lambda$: V=f$\lambda$. It is evident from this formula that in order to obtain long-lasting acceleration of the traveling wave in the stator winding it is necessary to increase either frequency f or traveling wave length $\lambda=2l_w$, where $l_w$ is the length of the winding turn. To increase frequency, the rotor of the power synchronous generator must accelerate its revolutions, which are limited by the durability of constituent materials. For example, a doubling of angular velocity engenders centrifugal forces capable of destroying the generator. Therefore, when the catapult initiates its movement, it is expedient to increase the frequency of the generator (from 0 to 60 Hz only) and then maintain it at a constant level f=60 Hz to increase the length of winding turns of the remaining part of the stator winding. Since the subsequent acceleration process will run at standard frequency, it is possible to supply the remaining part of the stator winding with power from a powerful energy system in parallel with the synchronous generator.

To prevent the rotor from falling out of synchronism—an effect that is possible owing to growth of the air resistance simultaneously with growing catapult rotor speed—it is necessary to increase the length of poles and pole pitches $\tau$ attaining the approximate equality $\tau \approx \lambda/2$ (see Pat. No. 5,208,496). This permits us to cause the propulsion force $F_p(t)$ to prevail over the sum of inertia strength $F_i(t)$, the gravity component $F_g(t)$ (when the rotor moves along an inclined trajectory), and air resistance $F_a(t)$ at each moment of accelerated movement:

$$F_p(t) > F_i(t) + F_a(t) + F_g(t) \quad (1)$$

and, thus, to insure a condition of dynamic synchronization of the catapult.

The proposed electromagnetic levitation catapult comprises two subsystems:

1. MDLSS—a Magnetodynamic Levitation and Stabilizing Self-Regulating System providing stable payload suspension during movement disclosed in U.S. Pat. No. 5,652,472;
2. EMC—an Electromagnetic Catapult accelerating the payloads.

The said catapult employs a physical phenomenon which has only now become achievable: the stable flight of a permanent magnet assembly moving along extended iron cores, and described in U.S. Pat. No. 5,652,472 issued Jul. 29, 1997, the subject matter of which is incorporated herein by reference, and other inventions represented in U.S. Pat. No. 5,140,208; No. 5,218,257; and No. 5,319,275.

The MDLSS 2 (Fig.1) provides for the stable flight of an individual payload supported by a chassis with affixed permanent magnet assembly (levitator) along a guideway (stator) with extended steel cores. The MDLSS represents a new type of Magnetodynamic Suspension—MDS. It is based neither on the permanent magnets' attraction to nor their repulsion from a guideway in the conventional concept, but exploits the motion of permanent magnets and also the special shape and nonlinear characteristics of the steel cores, creating forces that keep the levitator in stable flight along the guideway as if the levitator were drawn to an assigned trajectory.

Contrary to the incorrect but widespread concept described in Earnshaw's and Braunbek's theorems that it is impossible to build a system capable of achieving stable flight of some part within its own magnetic field, it is proven that such a system can be assembled from a new kind of magnetic devices called "units" with each providing equilibrium of its own magnets and creating stabilizing forces $F_s$, with their rigidity $\partial F_s/\partial z$ exceeding by 50–100 times the rigidity of the forces of existing electrodynamic suspension.

The EMC 3 (Fig.1 and 2) represents a quite new type of linear synchronous motor, distinguished from the existing ones in that the length of the stator winding turns and their bus-conductor cross-section increase with the distance from the starting point of acceleration. Moreover, the length of poles of the rotor's superconductive magnets is increasing during motion of the levitator thus providing synchronization, with insuring an approximate equality of the length of current traveling wave $\lambda$ in the stator winding to the dabble length 2$\tau$ of the rotor pole-pitches.

The ability of self-regulation and high rigidity of the stabilizing forces in the MDLSS system provide for safe levitator flight at small gaps between the levitator magnets and stator cores. This peculiarity permits the construction of a new kind of Catapult (for chassis and payloads propulsion with a small working air gap) employing superconductive magnets. The velocity of current traveling wave in the propulsion winding of the stator is proportional to its turn length. Thus, to increase velocity it is sufficient to increase the turn length of the stator winding. A peculiarity of the EMC construction is that during rotor movement it is possible to increase the length of the pole pitch of the rotor in accordance with increasing stator winding turn length and, thus, to employ the traveling current wave to create the propulsion force.

SUMMARY OF THE INVENTION

The proposed Electromagnetic Catapult comprises a linear guideway/stator assembly (stationary part) and superconductive magnet rotor assembly with synchronizing devices (moving part).

The guideway-stator of EMC consists of two pairs of mirror symmetrical parallel parts of the propulsion winding 3 (Fig. 1) distributed along the whole stator length and powered by three-phased sinusoidal current. Each of said mirror symmetrical parallel parts includes a common concrete beam and two toothed holders affixed to said beam, which bear the conductors of the three-phased winding. All the winding turns have vertical working segments containing one layer of copper buses. The remaining parts of the turns form two multi-layer end-faces which are rigidly attached to the concrete foundation of the guideway. Two layers of said working segments belonging to each pair of the winding form channel of constant width extended along the stator. The stator winding is distributed non-uniformly along the guideway, which consists of three types of sections:

1. a start section with invariable winding turn length;
2. an acceleration section where the winding turn length $l_w$ and the width $W_b$ of the winding wires gradually increase along the stator;
3. a deceleration section where the ends of phases are closed on a regulated resistance.

Accordingly, the length $\lambda$ and velocity V of the current traveling wave is also different in different sections of the guideway.

The winding of the acceleration section is broken down into subsections which are engaged only as the rotor flies past them. The busbar cross-section (i.e., the wire width) grows proportionate to the increase in winding turn length. Every subsection receives power from its own substation with its voltage and current attaining maximum values at the end of the acceleration section.

The rotor of the EMC comprises two long, narrow yokes 7 affixed on the both sides of the levitator's chassis 6, along its movement. Yokes contain partitions dividing them into separate cells with superconductive magnets of parallelepiped shape (with equal height $h_m$ and thickness $t_m$ but with different length) which are placed symmetrically with respect to the central plane of its cross-section. Closest to said central plane, the two superconductive magnets (and, respectively, the cells in which they are placed) are much longer than all the rest. These two magnets are affixed to the lower foundations of their yoke's cell. All the rest (short) are capable of being shifted across the yoke (Fig. 2), allowing them to be engaged gradually, as the rotor acceleration grows. All superconductive magnets are magnetized in a horizontal direction but perpendicular to rotor movement. Orientation of the magnetization vector of the magnets belonging to the front half of the yoke is the same but opposite to that belonging to the back one.

When installing the levitator's chassis on the stator the bottom halves of the rotor's yokes are inserted (with gaps) into said channels (Fig. 1), which are formed by the layers of the working segments of the three-phased windings. All short magnets are raised prior to start and occupy the upper parts of their cells, thus only the two long ones belonging to each of the yokes are inserted into its corresponding channel and their magnetic field crosses the working segments of the winding turns.

At the initial moment of launch, a synchronous generator connected with the stator's winding begins to run, gradually picking up speed. The frequency of current grows, thus increasing the current wave velocity propelling two pairs of the EMC rotor's large magnets along the start section. The short magnets are still situated in the upper parts of cells. Thus far, they are not engaged and their magnetic lines are closed above the winding or across the upper horizontal end-faces of the turns. Therefore, these magnets do not create propulsion forces.

At the end of the start section the current frequency attains 60 Hz and remains constant. At this moment an energosystem is switched on in parallel with said generator, which is supposed to supply all the remaining subsections of the winding acceleration section where the winding turn length (as well as wire cross-section) gradually increases along the stator. The catapult's rotor initiates the acceleration process.

There are several sensors installed along the acceleration section at the same intervals where the winding turn length gets an increment equal to the length of the next short magnet (counting from the center of the yoke). Flying past the next sensor, the rotor's synchronizing device receives a signal and engages a mechanism driving down two pairs of the short magnets (the front and back ones) simultaneously.

Magnetic flux density is considerable (4–6 T) in the vicinity of a pole surface of superconductive magnet. When said short magnets drop down into the air channel between the stator windings, more of working segments of the winding turns get into an intense magnetic field. The current wave traveling in the working segments interacts with the magnetic field and engenders an additional propulsion force which, in its turn, overcomes air resistance and accelerates the rotor. Simultaneously with the growing rotor speed, the synchronizing device increases the rotor magnet pole pitches by shifting down the short magnets in sequence, thus increasing the propulsion force of the catapult.

Upon reaching the deceleration section, the chassis starts braking. At this moment the payload is released from the chassis and continues its flight by inertia.

BRIEF DESCRIPTION OF THE DRAWINGS:

M=90000 kG, $V_f$=1800 m/S, $F_{ao}$=50000N, $V_O$=150 m/s, v=0.8

DETAILED DESCRIPTION

The Electromagnetic catapult of the present invention is used together with MDLSS (Magnetodynamic Levitation and Stabilizing Self-Regulating System) disclosed in U.S. Pat. No. 5,652,472 issued Jul. 29, 1997, the subject matter of which is incorporated herein by reference, (see 2 in FIG. 1), is located on the vehicle chassis under its middle part.

Figure 1:
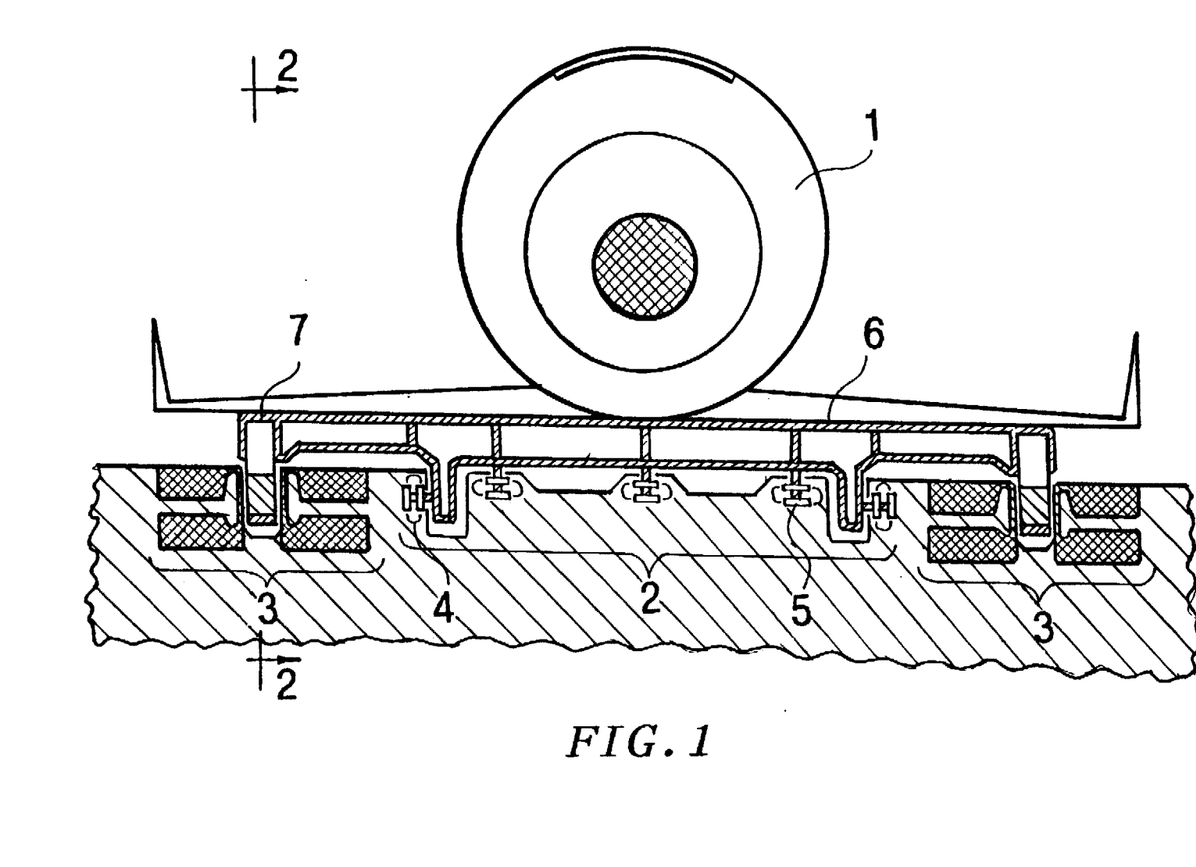
FIG. 1 is a schematic cross-sectional view of the Self-Regulating Electromagnetic Levitation Catapult together with the payloads and magnetodynamic levitation and stabilizing self-Regulation (MDLSS) system.
Figure 2:
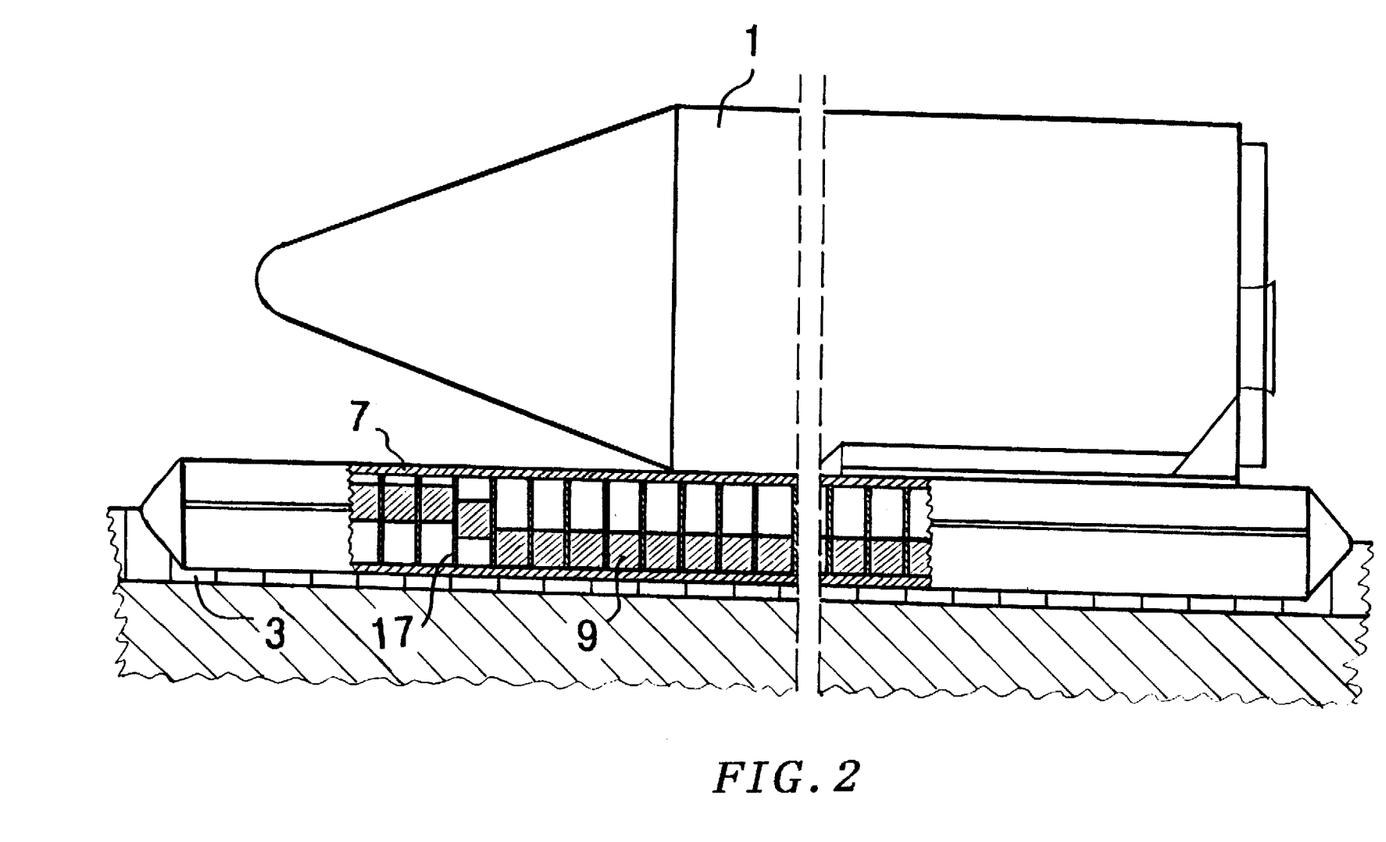
FIG. 2 is a side and partial-side sectional view of the stator winding of the Self-Regulating Electromagnetic Levitation Catapult together with the payloads and magnetodynamic levitation and stabilizing self-Regulation system.

The Electromagnetic Catapult comprises a linear guideway/stator assembly (stationary part) and superconductive magnet rotor assembly together with synchronizing device (moving part). As seen in FIGS. 1 and 2, the Electromagnetic Catapult of the present invention includes:

a) the guideway/stator 3, extended along the trajectory of the vehicle motion;

b) the levitator's chassis 6 with permanent magnets 4, 5 affixed on it;

c) the superconductive magnet rotor 7,8,9 which is fixed to the vehicle chassis 6 and has magnetic pieces 9 changing its pole pitches;

d) the synchronozing electronic device 15 for increasing stepwise the rotor pole pitches $\tau$ (simultaneously with increasing the turn length $l_w$ of the stator winding during the rotor motion) by engaging a synchronizing mechanism;

e) the synchronizing mechanism 10 for smooth downshifting of corresponding short magnets during rotor motion.

Figure 4:
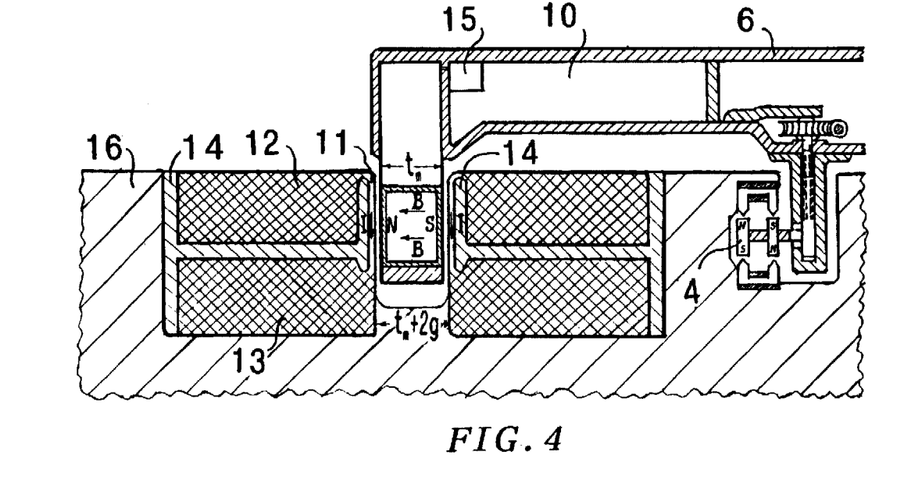
FIG. 4 is schematic partial cross-sectional view of the stator winding, rotor yoke, and the stabilization unit of MDLSS system.
Figure 5:
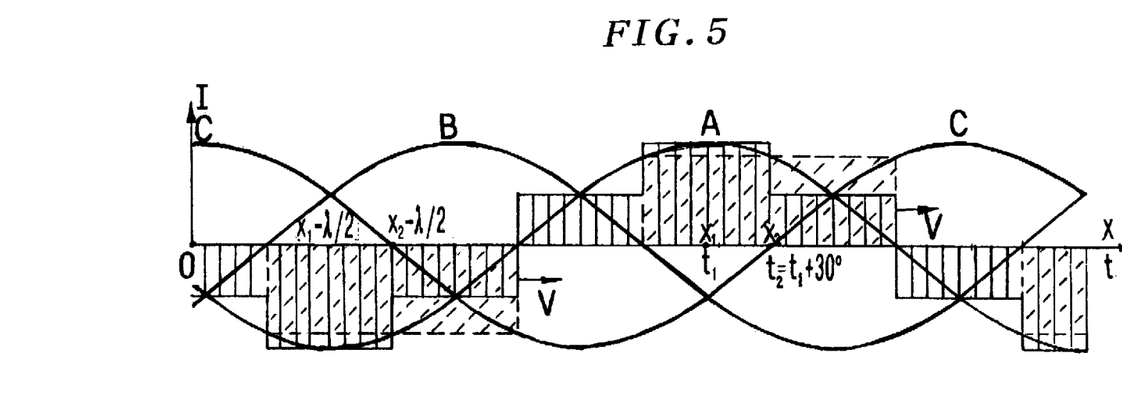
FIG. 5 is alternation in time of sinusoidal current and its distribution along the stator in the working layer's wires at the moment $t_1=90°$ (solid line) and at the moment $t_2=t_1+30°$ (dotted line)

The guideway/stator (see FIG. 4) has common concrete beams 16 with two toothed holders 14 and two pairs of three-phased conductive windings 11,12,13 which extend along the guideway. As seen in FIG. 4, each pair of stator windings is formed from two mirror-symmetrical parts. Each part includes one toothed holder 14 having a "T"-shaped cross-section. The holder is attached to the beam and supports conductors of working segments 11 belonging to the three-phased winding 3. When the three-phased stator winding is coupled to an electric generator, then (due to the time lag of the phase currents on ⅓ of the period and displacement of the conductors of adjacent phases on ⅔ of their turn length $l_w$ along the stator) the working segments of the winding generates a wave of current traveling along the stator with its velocity $V=2l_w \cdot f$ (FIG. 5)

The traveling current wave has a permanent amplitude if the conductors of the three-phased winding are thin and placed in three layers (one phase per layer) and also shifted with respect to each other by ⅔·$l_w$, and also if the density of the phase winding turns (i.e., the number of winding turns of the phase per unit of the stator length) alternates sinusoidally with the distance x along the stator. In our case the winding conductors are thick and all three phases must be placed with one layer in the slots of the tooth holder. Therefore, the running current wave amplitude has vibration.

Figure 6:
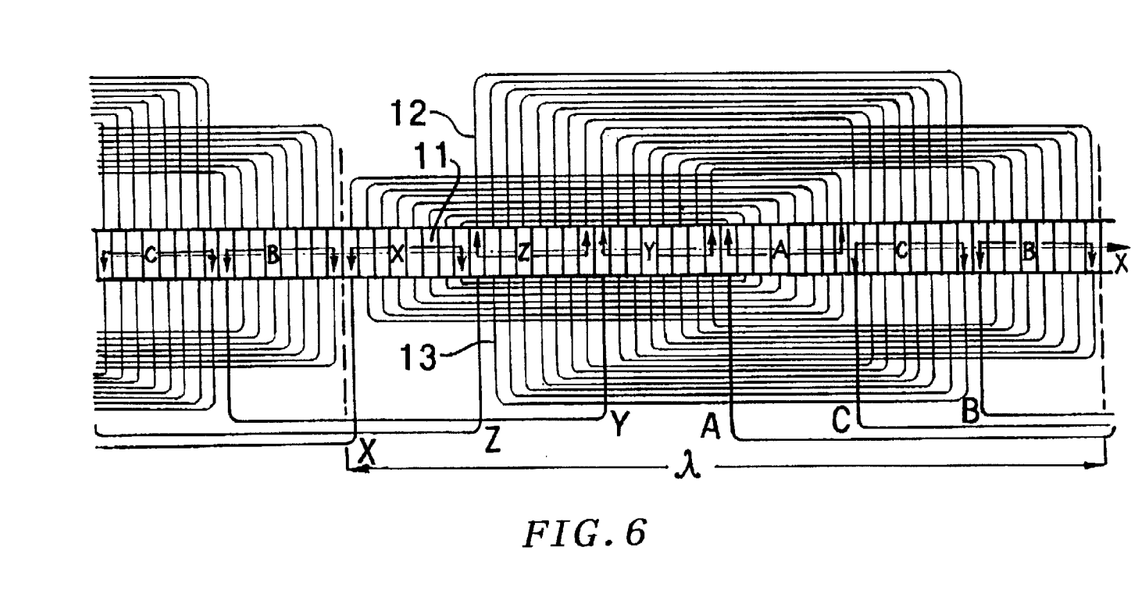
FIG. 6 is scheme of distribution of working segments and end-faces belonging to the three-phased stator winding with arrows showing the direction of phased currents in the working segments at the moment $t_1$.

As mentioned above, each of the stator winding turns gradually increases in length and cross-section, and its construction in the field is thus complex and expensive. To lower expenses for the stator winding it is expedient to assemble it by manufactured individual blocks. For this purpose it should be separable and concentric, as shown in FIG. 6. The verticle dotted lines there show where the winding may be cut while keeping the winding turns and end-faces unbroken.

At eight winding turns per pole and phase, the traveling wave length $\lambda$ equals 8·3·2=48 working segments (busbars) with the width $W_b=\lambda/48$. Placing the bars in one layer we can build current distribution in a layer of the winding working segments at different moments of time $t_i$ ($t_1$ and $t_2$, see FIG. 5). An analysis shows that the distribution of current in the wave travelling in said layer oscillates with frequency $f_0=6 \cdot f=360$ Hz.

If the approximate pole length $L_p$ is kept equal to 22·$W_b$ during the rotor motion, then its magnetic field covers 44 of total 48 segments, with the average current of the travelling wave $I_{av}=28 \cdot I_m$ oscillates with the frequency $f_0=6 \cdot f$ and amplitude $\Delta I \approx 5\%$ $I_m$, where $I_m$ is the amplitude of the current in one winding turn.

The conductors in the winding are copper buses. Each individual turn has a front and a back, which represent working segments 11, shown in FIG. 6, and two side parts 12 and 13 connecting the working segments. The arrows in FIG. 6 show the direction of phased currents in the working segments at the moment $t_1$. The working segments (which contribute in creation of Lorentz forces and counter electromotive forces) are fixed in the slots of holder 14 in a single layer. Two layers of said working segments belonging to each pair of the winding form a channel of constant width equal to $t_m+2$ g extended along the stator (FIGS. 1 and 4). The side parts (upper 12 and bottom 13) form the end-faces as a monolithic multilayer of conductors affixed to one another by an inner layer of electrical insulation. The end-faces 12,13 and toothed holders 14 are fixed to the concrete beam 16.

Figure 2A:
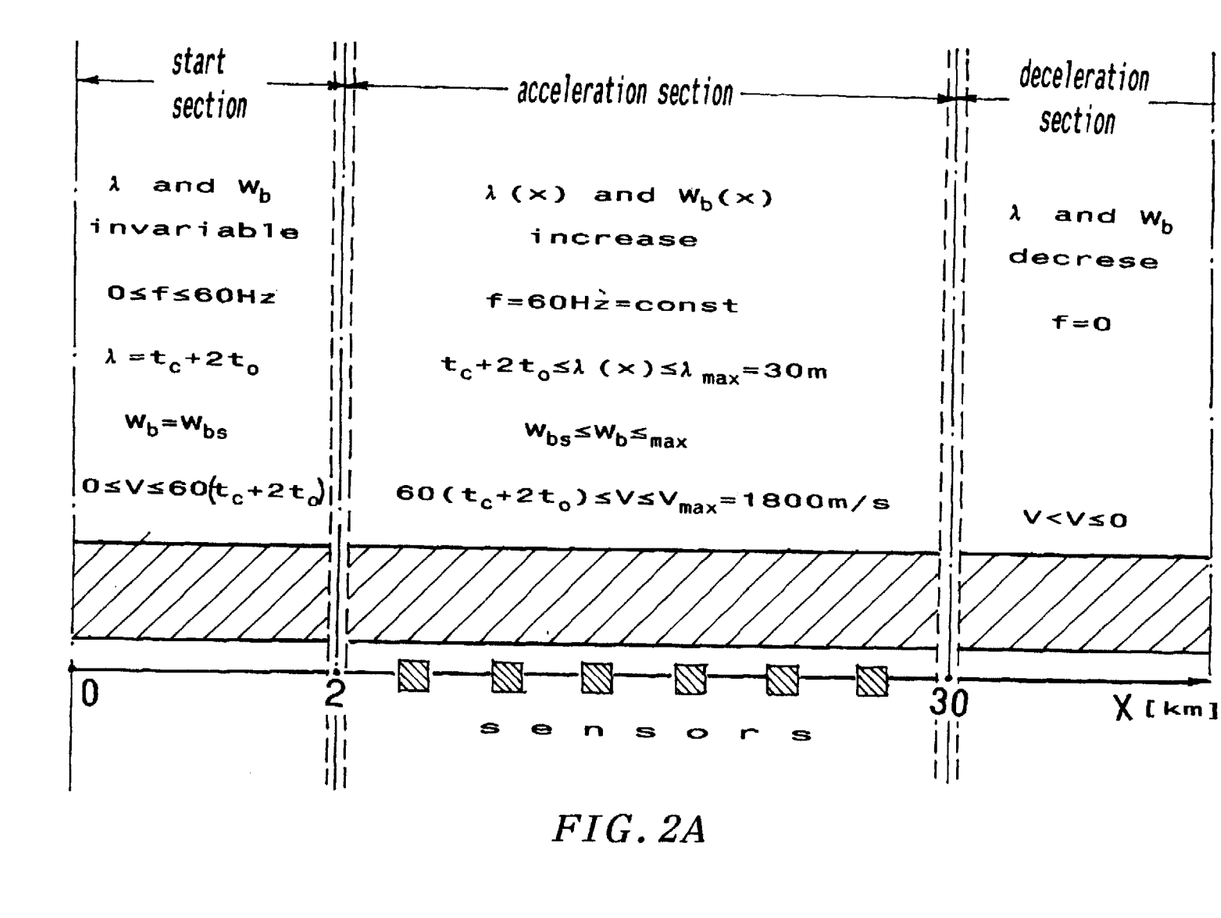
FIG. 2A shows schematically three distinct sections of the guideway-stator assembly and non-uniform distribution of the stator winding along the guideway according to the present invention.

The stator winding has three types of distinct sections (FIG. 2A);

1. a start section powered by three-phased sunusoidal current of alternative frequency with invariable winding turn length $l_w(x)$=const.;

2. an acceleration section powered by three-phased current of constant frequency in which the winding turn length $l_w$ and the width $W_b$ of the winding wires gradually increase along the stator;

3. a deceleration section which itself generates electromagnetic energy dissipated in the form of heat with its phase ends closed on regulated resistances.

The acceleration section is splited into a set of subsections, each energized by three-phased sinusoidal current from a separate transformer substation. Each of the winding turns comprises several parallel copper busburs of identical width $W_b$. The working segments of all the winding turns are inserted into slots of the toothed holder in a single layer (of width $W_b$). The farther the winding subsection from the beginning of an acceleration section, the more the cross-section of the winding turns increases by means of increasing the number of above parallel busburs proportionate (on an average) to the turn length $l_w$. Accordingly, current I, voltage U and power P if said feeding transformers are also growing.

In order to impart the required speed $V_f$ to given mass M (payloads plus vehicle) at the moment of payload departure from the Catapult rotor we have to find the necessary distribution of the length $l_w$ and width $W_b$ if stator winding turns as a function of the coordinate x, counted from the beginning of the acceleration section.

The rotor speed and its acceleration are constructively determined by the stator winding turn length at each point of the trajectory of movement:

$$V(x)=f\lambda(x)=2fl_w(x),\ a(x)=dV/dx \cdot dx/dt=V(x)V'_x$$

On the other hand, speed and acceleration are determined by the resulting force applied to the total mass (rotor plus payload). If forces counteracting the movement of said mass exceed propulsion force $F_p=Bh_m I$ then the rotor falls out synchronism. In this case, current in the winding grows rapidly and then immediately switches off. Therefore, to ensure the normal functioning of the Catapult at each point of its trajectory, the condition (1) must be fully ensured.

The force of aerodynamic resistance $F_a(x)=F_{a0}(V(x)/V_0)^2$ is proportional to square of the motion speed, where $F_{a0}$ is the force of resistance to the movement at the rotor speed equal $V_0$.

The force of inertia equals the product of the total mass M by acceleration a: $F_i(x)=M \cdot a(x)$.

If the Catapult moves obliquely with its trajectory inclined to the horizontal plane at angle $\alpha$, then the counteracting (gravity) force is: $F_g(x)=M \cdot g \cdot \sin \alpha$, where $g=9.81$ M/s$^2$.

Consequently, the condition for accelerating movement is:

$$F_p(x) \geq F_i(x)+F_a(x)+F_g(x) \qquad (2)$$

Now we express all parts of the inequalith (2) in terms of the length of the traveling wage $\lambda$ in the winding.

Estimation of propulsion force

As was mentioned above, every subsection of the acceleration section is fed by a major energosystem for a short time — only while the catapult's rotor is flying past. Therefore the permissible value of active current density in copper burbars of the winding $j_0$ is assumed to be 5 A/mm$^2$. Then, the linear density j of the amplitude of sinusoidal current in a layer of working segments with thickness $t_b=30$ mm and tooth thickness 0.3 $w_b$ is:

$$j=j_0 \cdot 30 \cdot 10^3 \cdot 0.7 \sqrt{2}=1.5 \cdot 10^5 \text{ A/m}$$

At the moment t (corresponding to the coordinate x of the rotor location) two composite magnets are situated in one rotor yoke, each has two poles of length $L_p(x) \approx 22 \cdot W_b$ and cover a layer of the working segments with average current $I_{av}=28 \cdot I_m$. Consequently, in the point x of the trajectory the magnets of the whole rotor cover four layers of the working segments with the total length $4 \cdot \lambda(x)$ and full current $I(x)$ $28/48 \cdot j \cdot \lambda(x)=4 \cdot k_j \cdot \lambda(x)$ (where $k_j=0.9 \cdot 10^5 \cdot A/m$) by their magnetic field.

We assume that the value of magnetic flux density on the magnet surface $B_0=5$ T. Then, considering such factors as: presence of barriers in the yokes, heat insulation placed around superconductive turns of magnets, and attenuation of magnetic fields when going away from the pole surface, we assume an average value of flux density in the layer of working segment $B=0.8 \cdot B_0=4$ T.

The height of the layer is $h_m$, the length of the layer is $\lambda(x)$. Then, the propulsion force of the catapult is:

$$F_p(x)=4 \cdot B \cdot h_m \cdot k_j \cdot \lambda(x)$$

Assuming $h_m=0.4$ m, $\lambda_{max}=30$ m we find $F_{p,max}=1700$ ton. The force of aerodynamic resistance dependent on the speed $$V(\lambda)=f \cdot \lambda \text{ is: } F_a(\lambda)=F_{a0}/V_0^2 \cdot f^2 \cdot \lambda^2$$

The force of inertia is: $F_i(\lambda)=M \cdot a$, where the acceleration is determined as: $a(x)=dV/dt=dV/dx \cdot dx/dt=V \cdot dV/dx=f^2 \cdot \lambda \cdot d\lambda/dx$.

The force $F_g$, which is opposed to movement of the rotor with mass M along the ascending trajectory inclined to the horizontal plane at angle $\alpha$, is $F_g(\lambda)=M \cdot g \cdot \sin \alpha$.

Estimation of parameters of the stator winding.

After substituting all forces in the inequality (2) by the above expressions, transferring $F_i(\lambda)$ into its left hand side and, then, dividing both parts by $f^2 \cdot M \cdot \lambda$ we obtain the differential equation with respect of $\lambda(x)$:

$$d\lambda/dx \leq 4B \cdot h_m \cdot k_j/(f^2 \cdot M)-F_{a0}/(v_0^2 \cdot M) \cdot \lambda(x)-g \cdot \sin \alpha/f^2/\lambda(x)$$

We designate $4B \cdot v \cdot h_m \cdot k_j/(f^2 \cdot M)=a_1$, where $v<1$, $F_{a0}/(V_0^2 \cdot M)=a_2$, $g \sin \alpha/f^2=a_0$, and now the above equation looks like:

$$\lambda'_x=a_1-a_2 \cdot \lambda(x)-a_0/\lambda(x) \qquad (3)$$

Solving this equation we obtain the distribution of $\lambda(x)$ and than we can determine all the parameters of the process determining the work of the Catapult, such as:

rotor speed: $V(x)=f \cdot \lambda(x)$, rotor acceleration: $a(x)=f^2 \cdot \lambda(x) \cdot (\lambda_i-\lambda_{i-1})/\Delta x$, current in each of the four windings: $I_{ph}(x) \approx \lambda(x) \cdot k_j/(49\sqrt{2})$, voltage drop in each phase of four the windings: $U_{ph}(x)=16 \cdot B \cdot h_m \cdot f \cdot \lambda(x)+\Delta U$, where $\Delta U$ is voltage drop on the resistance of a winding subsection, power consumed by each transformer substation:

$$P(x)=4 \cdot 3 \ I_{ph}(x) \cdot U_{ph}(x)=2 \cdot \sqrt{2} \cdot k_j \cdot f \cdot B \cdot h_m \cdot \lambda^2(x)$$

Figure 7:
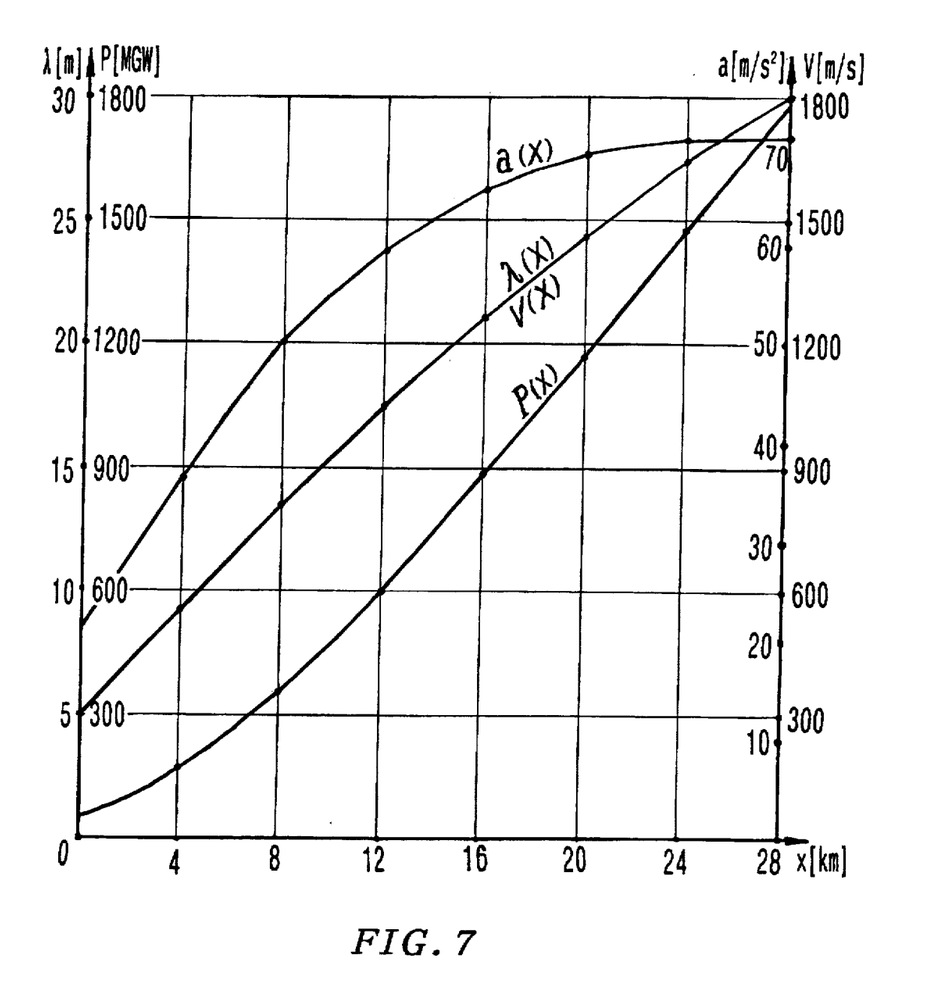
FIG. 7 is a curve showing distribution of the length of the winding turn, belonging to the acceleration section of the stator's winding, along the stator at the given values of parameters.

The results of the calculation of the catapult capable of accelerating mass $M=90$ t up to seppd $V_{max}=1800$ m/s are shown in FIG. 7.

Figure 3:
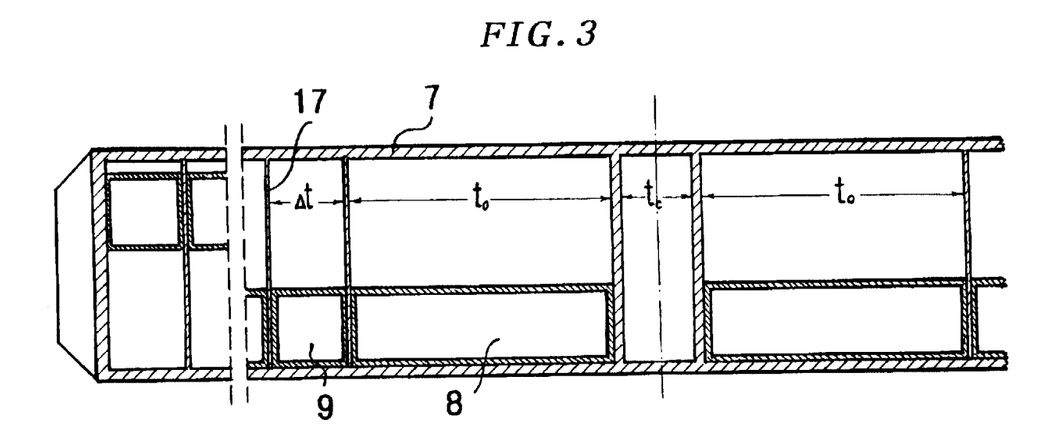
FIG. 3 is schematic axial section view of the rotor yoke.

The main parts of the rotor of the EMC are: two durable, narrow and long metallic yokes 7 affixed on both sides of the levitator's chassis 6 along its movement. FIG. 3 shows that a yoke has partitions 17 dividiing it into separate cells with superconductive magnets of parallelepiped shape (with equal height $h_m$ and width $w_m$ but with different length). Said cells are placed symmetrically with respect to the central plane YOZ of its cross-section. The central cell of the length $t_c$ is empty, i.e. it does not containa magnet. Next to the central cell (ahead and behind it) are two cells, each containing a superconductive magnet much longer than all the rest. These two long magnest of length $t_0$ are affixed to the lower foundations of their long yoke's cell. All the following cells are short and contain the short magnets of the length $\Delta t$ capable of downshifting across the yoke.

All superconductive magnets are horizontally magnetized, perpendicular to rotor motion. However, orientation of magnetization is opposite for the magnets belonging to different (front and back) halves of the yoke, though in each of said halves all of them have the same orientation, moreover, orientation of magnetization is opposite in the corresponding magnets belonging to left- and right-hand sides.

During installation of the catapult's chassis on the stator the bottom halves of the rotor's yokes are inserted (with gaps g) into above-mentioned channels formed by the layers of the working segments of three-phased windings. When the rotor is immovable (just before its start), or moves along the start section, all short magnets are lifted and occupy the upper part of their cells. Therefore, only two long magnets of length $t_0$ belonging to each yoke are inserted into corresponding channels and their magnetic field crosses the working segments of the winding turns.

At the initial movement of launch, a special high-power synchronous generator ($P=500$ MWt) capable of increasing frequency of three-phased working current from 0 up to 60 Hz, which is connected with the stator's winding, starts running and gradually picks up speed. The frequency of supply current grows, thus increasing current wave velocity and propelling two pairs of the EMC rotor's large magnets by the force $F_p(x)=B \cdot h_m \cdot I(x)$ along the start section. The short magnets 9 are still situated in the upper parts of the cells. So far, they are not engaged and their magnetic lines are closed above the winding or cross the upper horizontal end-faces of its turns. Therefore, these short magnets do not create propulsion forces.

At the end of the start section the current frequency attains 60 Hz and remains constant. At this moment a high power energosystem should be switched on in parallel with the above generator to supply all the remaining subsections of the winding acceleration section where the winding turn length (as well as wire cross-section) gradually increases along the stator. The catapult's rotor starts acceleration process. During rotor movement along the accleration section the short magnets are gradually (one after another) dropped down as rotor velocity grows.

Sensors are installed along the acceleration section at intervals, where the winding turn length gets an increment equal to the length $\Delta t_i$ of the next short magnet (counting from the center of the yoke). Flying past the next sensor, the rotor's synchronizing device receives a signal and engages a mechanism simultaneously driving down two pairs of the corresponding short magnets (front and back).

Magnetic flux density is considerable (about 4–6 T) in the vicinity of the pole surface of the superconductive magnet. When said short magnets drop down into the channel between the stator windings the additional working segments of the winding turns enter into an intense magnetic field. The current wave, traveling in the working segments interacting with the magnetic field, engenders an additional propulsion force which, in its turn, overcomes air resistance and accelerates the rotor.

Simultaneous with the growing rotor speed, the synchronizing device increases the rotor magnet pole pitches by shifting down the short magnets, thus increasing the propulsion force of the catapult.

Reaching the deceleration section, the chassis starts braking (with permissible negative acceleration), its kinetic energy transforming into electrmagnetic or heat. At this moment the payloads releases, continuing its flight by inertia. Then its rocket engine is engaged, increasing payload speed and inclination angle between trajectory and horizon. Meanwhile, the chassis decelerates to a complete stop and then returns to the starting point.

What is claimed is:

1. An electromagnetic catapult for preliminary acceleration of an individual payload, comprising:
   a) a guideway-stator assembly extended along the trajectory of the payload motion and comprising two pairs of mirror-symmetrical three-phased stator windings; the guideway-stator assembly having distinct sections thereof, including a start section, an acceleration section and a deceleration section, each of said stator windings having distinct turn length and cross-section of conductors thereof in said distinct sections;
   b) levitator means providing stable suspension of the payload during movement thereof along said trajectory and including chassis supporting the payload;
   c) a superconductive magnet rotor having changeable size of a rotor pole pitch and comprising a pair of metallic yokes, each affixed on a respective side of said chassis and extended therealong; each said yoke including a plurality of separate cells accommodating superconductive magnets, said superconductive magnets including a group of short magnets and a group of long magnets; and
   d) synchronizing devices coupled operatively with said superconductive magnet rotor and increasing in steps the size of rotor pole pitch during vehicle motion by shifting the short magnets downward in accordance with the turn length of the stator windings in said distinct sections.

2. The electromagnetic catapult of claim 1, wherein said guideway-stator assembly includes toothed holders supporting said stator windings and forming respective slots; wherein every single turn of the stator windings includes front and back vertical working segments, and further includes side horizontal parts connecting said working segments; wherein said working segments are inserted and fixed in the slots formed by the toothed holders and form a single layer of conductors; said side horizontal parts of the stator windings forming monolithic multilayer upper and bottom end-faces of conductors sandwiched together with an inner layer of electrical insulation; said end-faces and said toothed holders being rigidly attached to the guideway; wherein said single layers of the working segments of two pairs of the stator windings form vertical walls of two channels extended along the stator at respective sides thereof; wherein said working segments of the turns create Lorentz forces and counter electromotive forces; wherein, when said windings are powered with three-phased alternative current, a traveling current wave arises in each layer of conductors and runs along said channels and across said working segments of the conductors; and said traveling wave having variable velocity and acceleration in said distinct sections of the guideway-stator assembly.

3. The electromagnetic catapult of claim 1, wherein in said start section, the stator winding has invariable winding turn length and is powered by three-phased sinusoidal current of alternating frequency; wherein in said acceleration section, the stator winding has the winding turn length and the width of the winding conductors gradually increasing along the stator and is powered by three-phased current of constant frequency; wherein in said deceleration section, the stator winding generates electromagnetic energy dissipated in the form of heat, phase ends thereof being connected through regulated resistances.

4. The electromagnetic catapult of claim 3, wherein the stator winding of the start section is powered by a special high power synchronous generator capable of increasing frequency of three-phased working current from 0 up to 60 Hz.

5. The electromagnetic catapult of claim 3, wherein the stator winding of the acceleration section is distributed non uniformly along the stator with the length $\lambda/2$ of the stator winding turns increasing correspondingly to the solution of the differential equation $\lambda'_x = a_1 - a_2 \cdot \lambda(x) - a_o/\lambda(x)$, wherein $a_0$, $a_1$, and $a_2$ are determined by values of parameters of the electromagnetic catapult.

6. The electromagnetic catapult of claim 3, wherein the stator winding of the acceleration section is split into a set of subsections, each energized by three-phased sinusoidal current coming from a separate transformer substation connected to a high power energosystem; wherein the cross-section of the winding turns increases substantially proportionate to the turn length thereof.

7. The electromagnetic catapult of claim 3, wherein the stator winding of the acceleration section is separable and concentric and is cut, while the winding turns and end-faces thereof are unbroken.

8. The electromagnetic catapult of claim 1, wherein all superconductive magnets are horizontally magnetized in direction perpendicular to rotor motion, wherein orientation of magnetization for the magnets belonging to front half of the yoke is opposite to the orientation of magnetization of the magnets belonging to back half of the yoke, in each of said front and back halves, the magnetization has the same orientation; and orientation of magnetization is opposite in the corresponding magnets belonging to left- and right-hand sides.

9. The electromagnetic catapult of claim 8, wherein said cells of the yoke are placed symmetrically with respect to the central plane of said yoke cross-section; wherein a central cell is empty; wherein cells disposed contain long superconductive magnets which are affixed to a lower foundations thereof; and wherein remaining cells contain short magnets capable of downshifting across the yoke.

10. The electromagnetic catapult of claim 8, wherein during installation of the catapult's chassis on the stator the bottom halves of the rotor's yokes are inserted into said channels with gaps therebetween; wherein when the rotor moves along said start section, four long magnets inserted into channels are engaged, with their magnetic field crossing the working segments of the winding turns and thereby propelling the rotor; and wherein short magnets are placed at the upper part of respective cells, thereby failing to be engaged and thereby failing to create the propulsion force.

11. The electromagnetic catapult of claim 10, wherein during rotor movement along the acceleration section the short magnets are engaged in sequence, one after another, by dropping down into the channels between the working segments, thus increasing the pole pitch length simultaneously with increasing stator winding length and thereby increasing traveling current wave; wherein interaction of the traveling current wave in the stator with magnetic field created by the magnets of the rotor grows as the rotor moves away from the beginning of the acceleration section, said beginning coinciding with joint between the start section and the acceleration section, thereby overcoming the growing forces of aerodynamic resistance and inertia.

12. The electromagnetic catapult of claim 1, wherein a plurality of sensors are installed along the acceleration section at intervals, where the stator winding turn length is increased with an increment equal to the length of the next short magnet; wherein passing a respective sensor, the synchronizing device receives a signal corresponding to said increased turn length and engages a mechanism, simultaneously driving down two pairs of the corresponding front and back short magnets.

\* \* \* \* \*